United States Patent [19]

Sansalone

[11] Patent Number: 5,226,567
[45] Date of Patent: Jul. 13, 1993

[54] GARDEN POWDER DUSTER

[75] Inventor: Dominic A. Sansalone, 5421 Menlo Ct., Barberton, Ohio 44203

[73] Assignee: Dominic A. Sansalone, Barberton, Ohio

[21] Appl. No.: 770,533

[22] Filed: Oct. 3, 1991

[51] Int. Cl.$^5$ .......................................... B65G 69/06
[52] U.S. Cl. .................. 222/195; 222/325; 222/333; 222/637; 406/38; 406/141
[58] Field of Search ............... 222/195, 325, 333, 630, 222/637; 406/38, 136, 139, 141, 142, 146

[56] References Cited

U.S. PATENT DOCUMENTS

| | | | |
|---|---|---|---|
| 197,601 | 11/1877 | Cassidy | 406/136 |
| 999,275 | 8/1911 | Theim | 406/139 |
| 1,276,653 | 8/1918 | Herbert et al. | 406/136 |
| 1,406,903 | 2/1922 | Rose | 222/195 X |
| 1,561,039 | 11/1925 | Walker | 406/136 X |
| 1,838,648 | 12/1931 | Atwood | 222/630 |
| 2,029,408 | 2/1933 | Bramsen et al. | 91/8 |
| 2,126,924 | 8/1938 | Rose | 222/195 X |
| 2,675,147 | 4/1954 | Odom | 406/136 |
| 2,792,151 | 5/1957 | Wagner | 222/193 |
| 2,870,565 | 1/1959 | Martin | 43/148 |
| 3,123,362 | 3/1964 | Elvers | 275/1 |
| 3,854,634 | 12/1974 | Hart | 222/192 |
| 4,256,241 | 3/1981 | Mesic | 222/85 |
| 4,678,377 | 7/1987 | Bouchard | 406/139 |

FOREIGN PATENT DOCUMENTS 505717 9/1954 Canada ............... 406/146
978700 4/1951 France ............... 406/146

Primary Examiner—Andres Kashnikow
Assistant Examiner—Joseph A. Kaufman
Attorney, Agent, or Firm—Frank J. Troy, Sr.

[57] ABSTRACT

A portable garden power duster for applying dusting agent to garden plants is provided. The power duster comprises an air blower; an air-flow receiving tube removably attached to the an air blower which contains an air baffle attached to the bottom of the tube extending vertically through only a portion of the tube's diameter thereby leaving s space for the passage of air flow through the receiving tube, a positive air duct located at the base of the air baffle on the positive side thereof and a hole located at the base of the air baffle on the negative side thereof; and a dusting agent container removably attached to the bottom of the air-flow receiving tube which contains a lid having an input hole and an output hole and a discharge tube containing a plurality of circumferential holes, wherein the input and output holes of the container lid are in communication with the positive air duct and hole in the air-flow receiving tube and wherein the discharge tube extends vertically from the dusting agent container through both the output hole of the container lid and the hole in the bottom of the air-flow receiving tube and into the air-flow receiving tube on the negative side of the air baffle.

7 Claims, 5 Drawing Sheets

GARDEN POWDER DUSTER

BACKGROUND OF THE INVENTION

The present invention relates to an apparatus for dispensing powder or other particulate matter in an air or gaseous stream. More particularly, the invention relates to a garden power duster for applying dusting agent to garden plants.

Various types of apparatus for applying powder or other particulate matter to plants or other objects are known in the prior art as illustrated by the following patents.

U.S. Pat. No. 4,678,377 to Bouchard relates to an apparatus for dispensing particulate matter which comprises an amorphous bag or pouch containing powder, a gas inlet at one end of the pouch adapted to receive a pressurized gaseous stream from an air blower and a gas outlet at the opposite end of the pouch which directs the gas stream out of the pouch, preferably to an elongated delivery tube. By squeezing and manipulating the pouch and powder therein, the amount of powder entrained in the gas stream within the pouch can be controlled.

U.S. Pat. No. 4,256,241 to Mesic relates to a fluid-solid mixing and dispensing apparatus primarily intended for use in the application of pesticide dust. The apparatus comprises a blower and a removable, disposable pesticide dust cartridge attachable in fluid communication relation to at least a portion of the blower's fluid flow stream. A volume control is provided so as to regulate the quantity of fluid flowing through the cartridge, thereby regulating the quantity of pesticide dust actually dispensed.

U.S. Pat. No. 2,870,565 to Martin relates to a dust-disseminating device which is attached to a hopper having an open top and containing a quantity of dusting material. The dust-disseminating device includes a cover arranged to bridge the open top of the hopper and adapted to be detachably secured thereto to provide an enclosed chamber wherein the dusting material may be gradually fed into and entrained by an air stream by an activating means for dissemination. Advantageously a blower may be associated with the hopper to introduce the air stream through the cover into the chamber provided by the hopper. The air stream produced by the blower is projected downwardly and forwardly in the chamber by a baffle which is constructed to direct the air stream to make multiple passes through the chamber whereby the dusting material is effectively entrained in the air stream. The chamber and baffle are shaped and dimensioned to cause the air stream with entrained dusting particles to change direction sharply during passage through the chamber whereby larger dust particles tend to automatically segregate from the more finely divided and entrained particles.

However, to applicant's knowledge only manually or hand-operated dusting devices are presently commercially available to gardeners but no economic portable power dusters. It is presumed that the failure of prior power devices such as those described above to enter the commercial arena relates to their complexity, lack of portability, high cost or tendency to clogging or other types of failures.

Accordingly, a garden power duster which is relatively simple mechanically, highly reliable in operation, low in cost and portable enough for the gardener to easily carry is highly desired by gardeners.

SUMMARY OF THE INVENTION

In accordance with the present invention, there is provided a portable garden power duster which is of relatively simple mechanical construction. The power duster features a direct in-line dispensing system which simplifies the delivery of the entrained air-powder mixtures while being low in cost and highly reliable in operation.

The power duster comprises a blower means which provides the primary air or gas flow for the operation of the duster. The blower means may be powered by either electricity, gasoline or battery. In the embodiment shown, the blower means comprises a cordless, battery-charged air blower.

An air-flow receiving tube is removably attached to the end of the blower means. The air-flow receiving tube contains an air baffle attached to the bottom of the tube which extends vertically through only a portion of the diameter of the tube thereby leaving a space over the top of the baffle for the passage of air through the tube. The air-flow receiving tube further contains a positive air duct located at the base of the air baffle on the positive or air entry side of the baffle and a hole located at the base of the baffle on the negative side of the baffle.

A dusting agent container is removably attached to the bottom of the air-flow receiving tube in such a manner that the dusting agent in the container is in communication with the positive air duct and hole located at the bottom of the air-flow receiving tube. In a preferred embodiment, the dusting agent container having a lid containing an input hole an and output hole and a saddle shaped block containing matching holes are attached to the bottom of the air-flow receiving tube with the holes in the container lid and saddle block being in communication with the positive air duct and hole in the bottom of the air-flow receiving tube. The dusting agent container further includes a discharge tube containing a plurality of circumferential holes which extends vertically through the output hole in the container lid, the matching hole in the saddle block and the hole in the bottom of the air-flow receiving tube into the air-flow receiving tube on the negative side of the air baffle. The plurality of circumferential holes in the discharge tube is provided to assist in mixing the dusting agent.

In a preferred embodiment, a control lever is mounted on the top of the dusting agent container lid to control the flow of air passing through the positive air duct into the dusting agent container.

In operation, the blower means generates a flow of air or other gas which passes into the air-flow receiving tube. A portion of the air flow passes over the air baffle through the tube and is discharged from the end of the tube while a portion of the air flow is diverted by the air baffle through the positive air duct into the dusting agent container. The positive air pressure passing into the dusting agent container forces the dusting agent particles into the discharge tube and then into the negative pressure side of the air baffle. The air flow passing over the open space above the baffle picks up the dusting agent forming an air-dust mixture which is then discharged from the end of the air-flow receiving tube and onto the plants to be dusted.

Any configuration desired at the discharge end of the air-flow receiving tube will relate to the diameter of the tube, the amount of air flow generated by the blower means and the desired broadcast span of the dusting agent particles. Thus, the end of the tube could be flared as shown in FIGS. 1 and 2, conical, splayed, etc.

DETAILED DESCRIPTION

Figure 1:
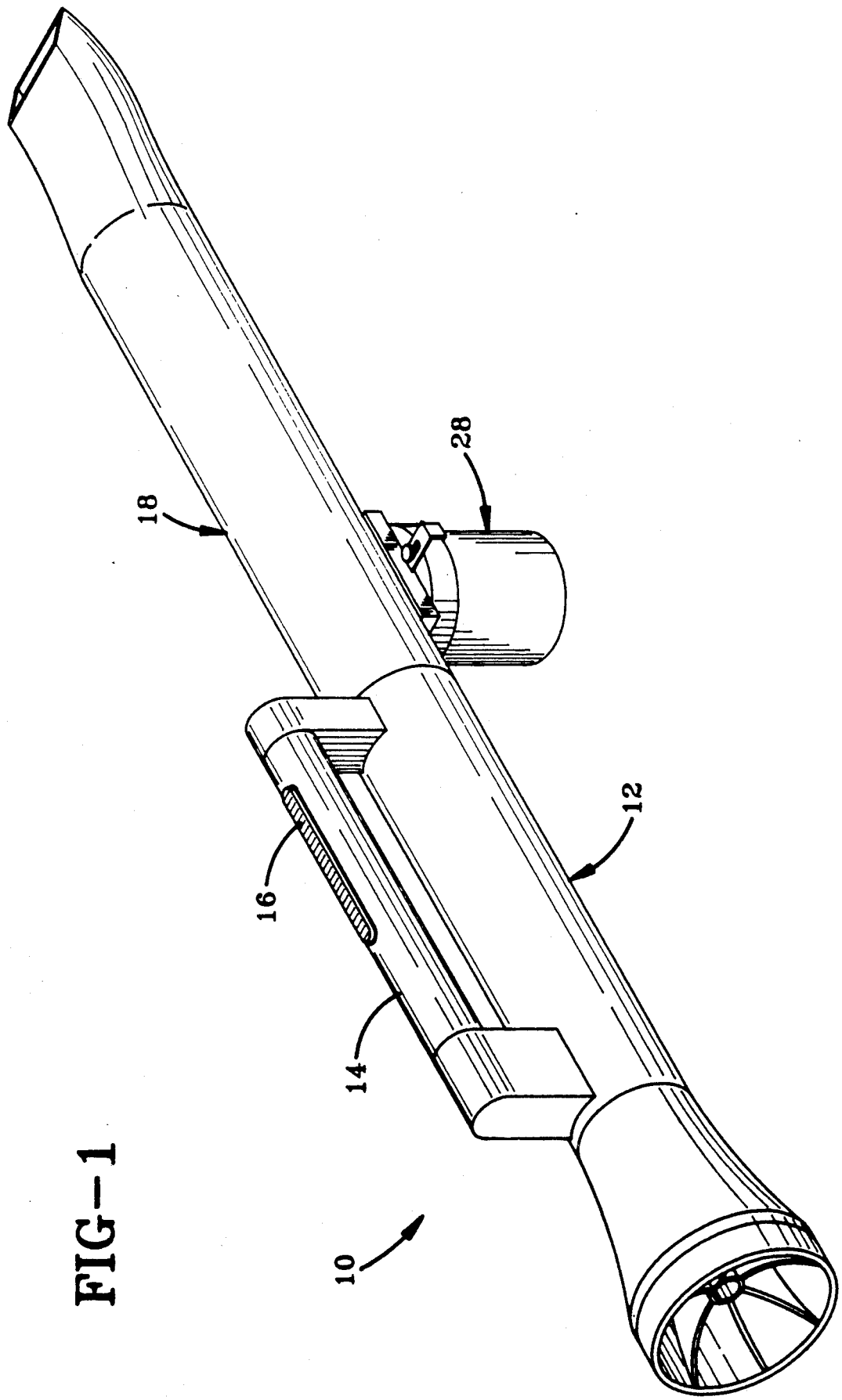
FIG. 1 is a perspective view of a garden power duster of the invention.

The garden power duster of the invention is generally indicated as 10 in the view of FIG. 1. Garden power duster 10 comprises a blower means 12, an air-flow receiving tube 18 and a dusting agent container 28.

As illustrated in FIG. 1, blower means 12 includes a handle 14 and a switch 16 located on the handle. As illustrated in the drawings, blower means 12 is a cordless, battery powered air blower of conventional construction. However, a gasoline of electrically powered air blower can also be utilized. Operation of blower means 12 is regulated by simply moving the switch to the on or off position.

Figure 2:
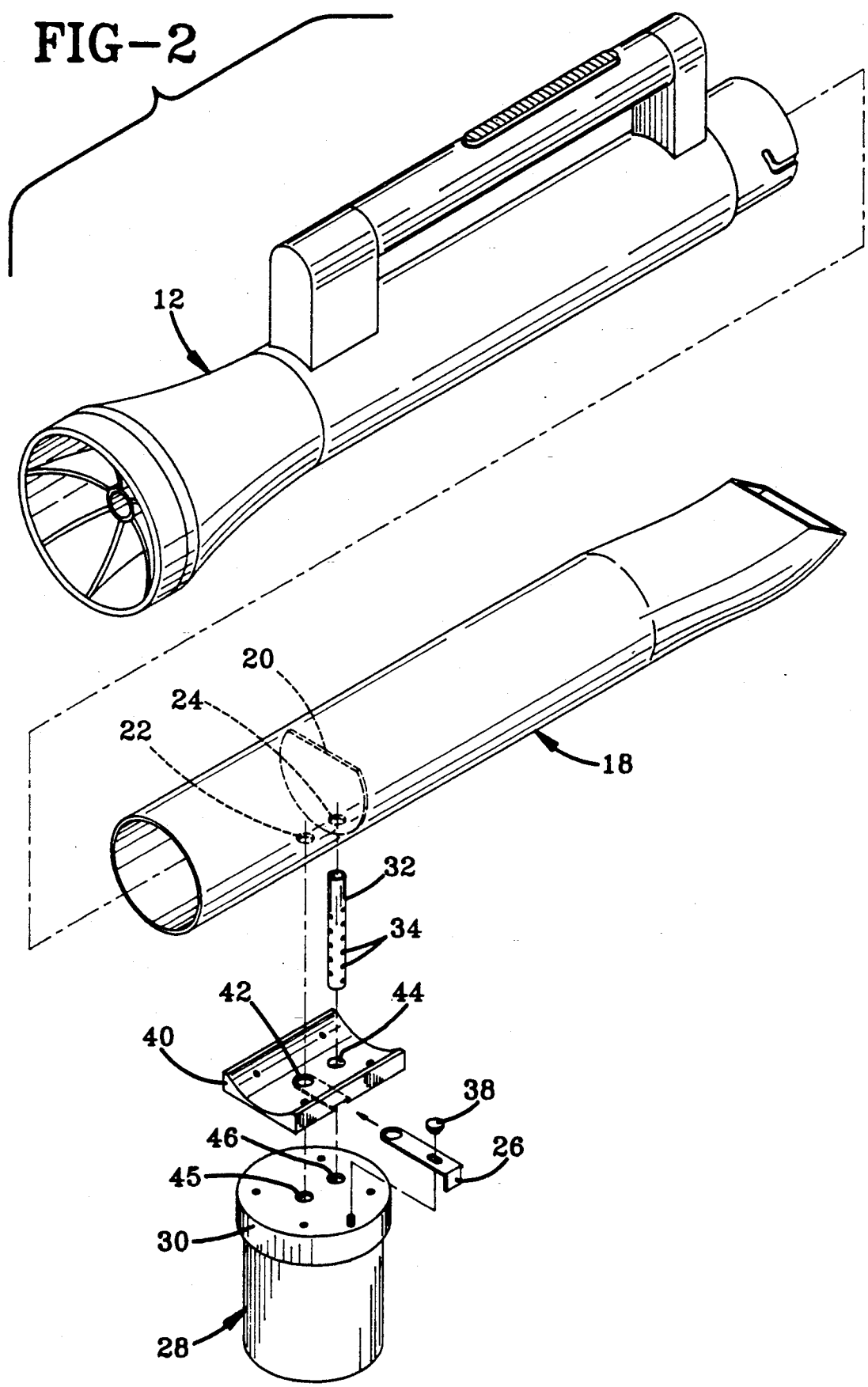
FIG. 2 is an elevational view of the garden power duster showing the air-flow receiving tube removed from the end of the blower means and in partial section to show interior details and the dusting agent container removed from the bottom of the air-flow receiving tube to show details of the saddle block, position of the discharge tube, position of the control lever and container lid.

As show in FIG. 2, air-flow receiving tube 18 which is removably attached to the blower means 12 includes an air baffle 20, a positive air duct 22 located at the bottom of the tube on the air entering or positive side of air baffle 20 and a hole 24 located at the bottom of tube on the opposite or negative side of air baffle 20. Air baffle 20 which is attached to the bottom of air-flow receiving tube 18 extends vertically through only a portion of the diameter of the tube thereby leaving or defining a space over the top of air baffle 20 for the passage of air directly through air-flow receiving tube 18. The position of air baffle 20 in air-flow receiving tube 18 can be seen in FIG. 2 but is more clearly shown in FIGS. 4 and 5. The positions of positive air duct 22 and hole 24 in the bottom of air-flow receiving tube 18 is readily seen in FIG. 2 but can also be seen in FIG. 3.

Air-flow receiving tube 18 as shown in FIG. 2 is removably attached to blower means 12 by means of a locking groove located on the outside of the tube at the end of blower means 12 and associated knobs or buttons (not shown) on the air entering end of air-flow receiving tube 18. However, air-flow receiving tube 18 can be securely attached to blower means 12 by various methods such as, for example, by including grooves in the end of blower means 12 and treads in the end of air-flow receiving tube 18.

Positive air duct 20 and hole 24 can be incorporated in the bottom of air-flow receiving tube 18 by any convenient method including drilling or molding during the tube molding process. Air baffle 20 can also be incorporated into air-flow receiving tube 18 by various methods. This, for example, a groove could be cut into the bottom of the tube to the desired baffle height and the air baffle inserted into the tube and adhered in place using a conventional adhesive. Alternatively, air baffle 20 could be incorporated into air-flow receiving tube 18 by molding during the tube molding process.

Air-flow receiving tube 18 can be made of any strong light-weight material but is preferably made of plastic.

Figure 4:
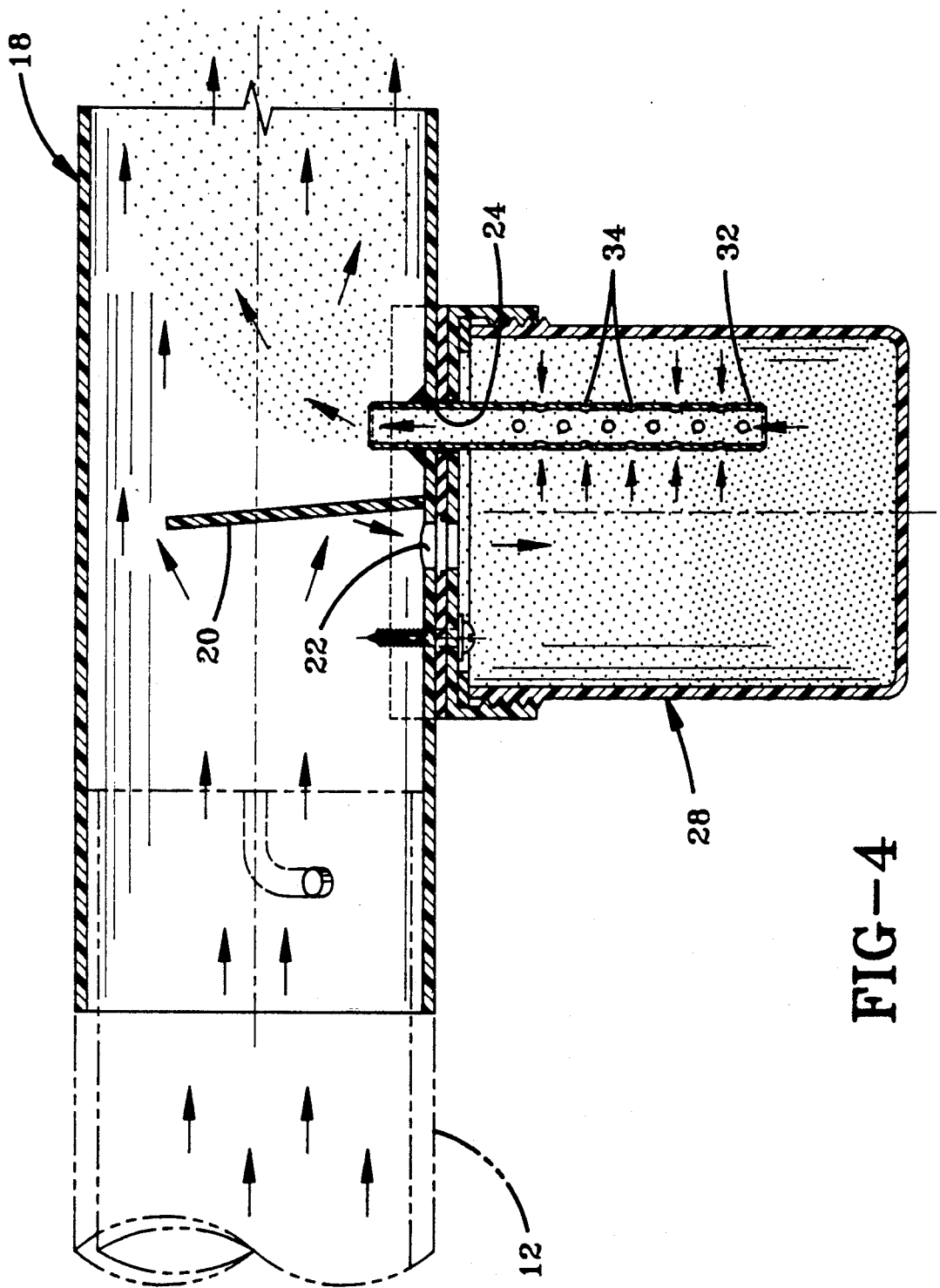
FIG. 4 is a side elevational view taken along line 4—4 of FIG. 3 with parts broken away and sectioned to show interior details of the air-flow receiving tube including the position of the air baffle and the dusting agent container including the position of the discharge tube with arrows showing the direction of air flow through the tube and into the dusting agent container and the passage of dusting agent particles from the discharge tube into and through the air-flow receiving tube.

Dusting agent container 28 as shown in FIG. 2 is removably attached to the bottom of air-flow receiving tube 18 by means of saddle block 40 using tap-in screws. However, it should be noted that dusting agent container 28 could, if desired, be attached directly to the bottom of the tube using tap-in screws, as shown in FIG. 4, or by molding the container lid onto the bottom of the tube.

Saddle block 40 as illustrated in FIG. 2 contains two holes 42 and 44 which are in communication with positive air duct 22 and hole 24 of air-flow receiving tube 18 and also with input hole 45 and output hole 46 of the container lid 30 of dusting agent container 28. This feature is clearly indicated by the dotted lines in FIG. 2.

Dusting agent container 28 as shown in FIG. 2 includes a container lid 30 having an input hole 45 and an output hole 46 which are in communication with holes 42 and 44 of saddle block 40 and with positive air duct 22 and hole 24 in air-flow receiving tube 18. This is again indicated by the dotted lines in FIG. 2. It is also shown in FIG. 4.

The dusting agent container further includes a discharge tube 32 which contains a plurality of circumferential holes 34. Discharge tube 32 extends vertically from dusting agent container 28 through output hole 46 of container lid 30 then through hole 44 of saddle block 40 and into and through hole 24 of air-flow receiving tube 18. This is indicated in FIG. 2 where discharge tube 32 is shown removed from dusting agent container 28 with the dotted line indicating that discharge tube 32 extends through holes 24, 44 and 46. This feature is more clearly shown in FIG. 4 which shows discharge tube 32 extending vertically from dusting agent container 28 through hole 24 in the bottom of air-flow receiving tube 18 and into the tube on the negative side of air baffle 20 and in FIG. 5 where discharge tube 32 is also shown extending through saddle block 40.

Figure 3:
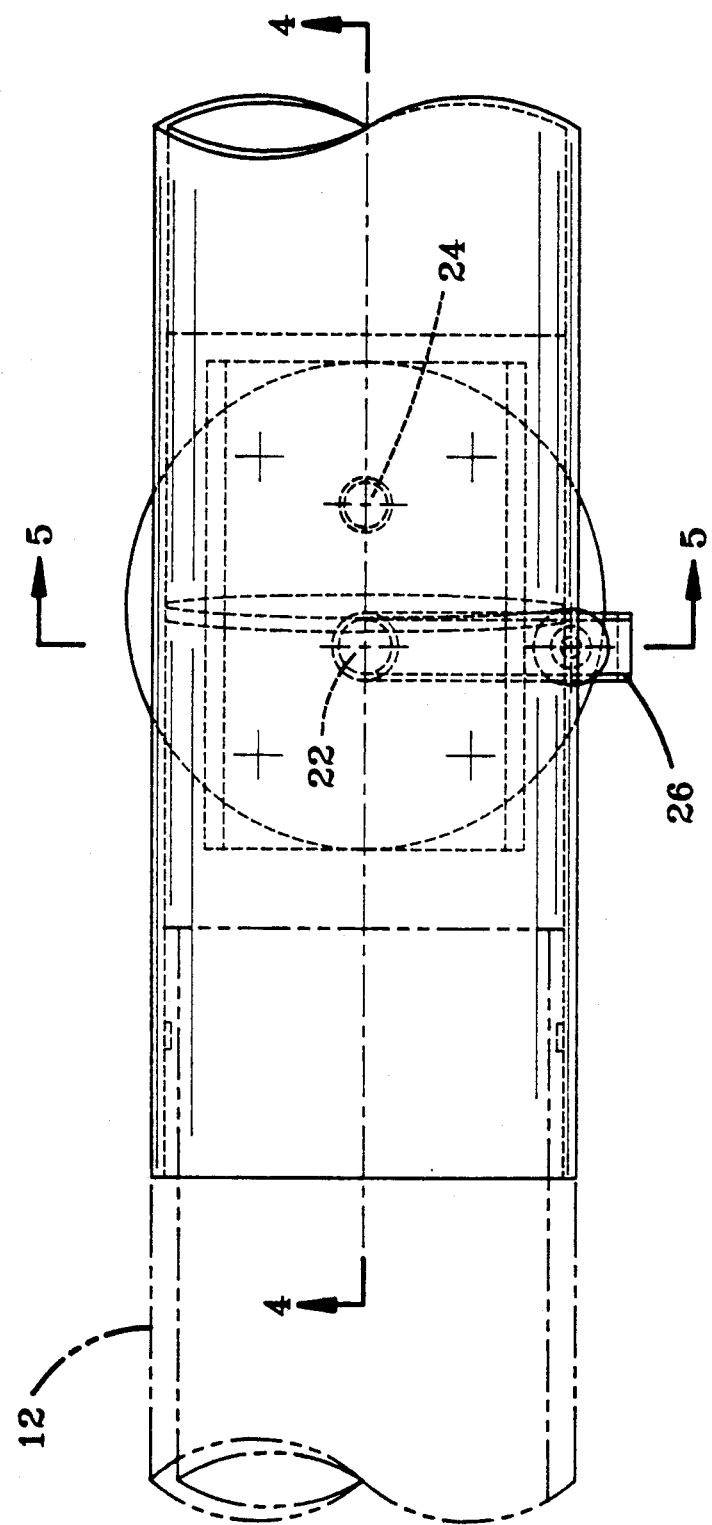
FIG. 3 is a top elevational view of the air-flow tube looking from the top of the tube downward partially in section to show the position of the positive air duct at the bottom of the tube, the position of the control lever which controls the volume of air passing from the positive air duct into the dusting agent container and the position of the hole in the bottom of the tube through which dusting agent particles pass from the container into the air-flow receiving tube.
Figure 5:
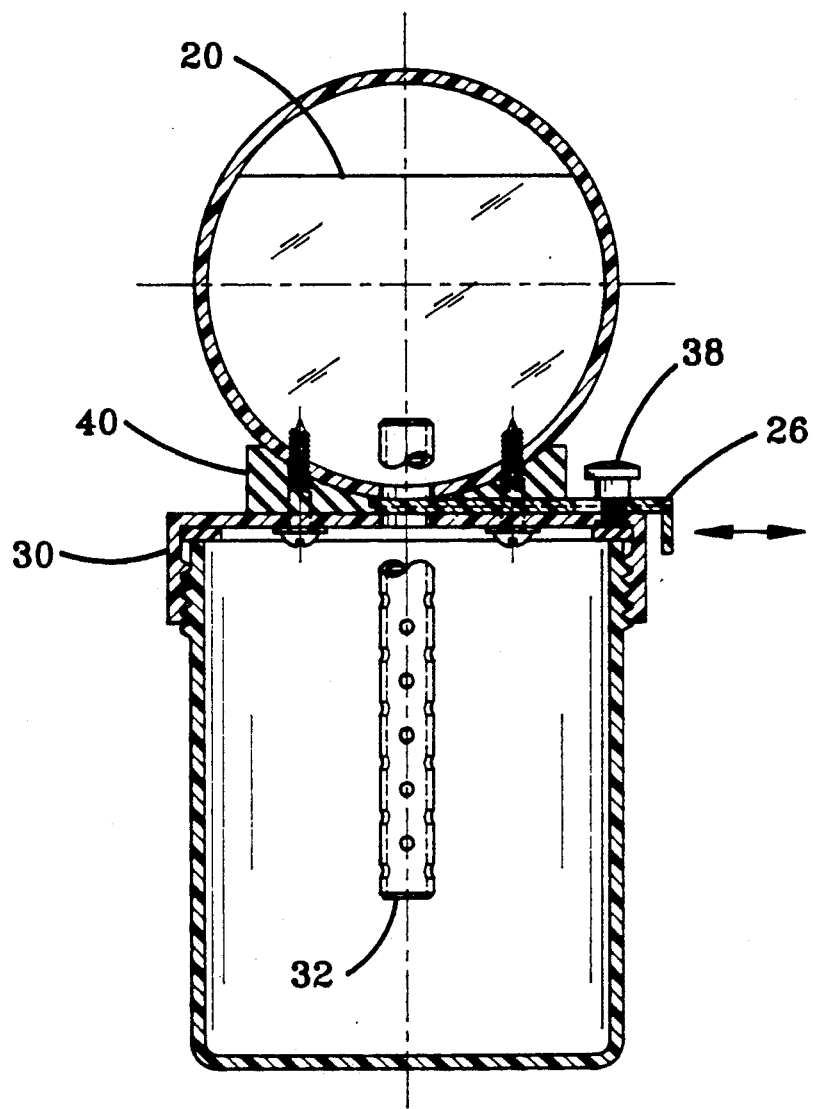
FIG. 5 is an end elevational view taken along line 5—5 of FIG. 3 looking in the direction of the arrows with parts broken away and sectioned to show interior details of the air-flow receiving tube and dusting agent container and particularly the position of the discharge tube extending from the dusting agent container into the air-flow receiving tube.

As shown in FIGS. 2, 3 and 5, dusting agent container 28 in a preferred embodiment includes an adjustable control lever 26 which is mounted on container lid 30. The function of control lever 26 is to control the volume of air passing from positive air duct 22 of air-flow receiving tube 18 through input hole 45 of container lid 30 into dusting agent container 28 thereby permitting control of the air/dust ratio. Control lever 26 which is shown separated from container lid 30 in FIG. 2 includes a slot in one end permitting movement of the lever between open and closed positions in the directions indicated by the arrow in FIG. 2. The slot in the end of control lever 26 fits over a threaded bolt secured to the end of container lid 30. A locking nut or button 38 is includes as illustrated in FIG. 2 which permits the lever to be locked in the desired position.

The dusting agent container 28 can be of any convenient type such as plastic, plexiglass, glass or the like but a strong, clear plastic is preferred.

The garden power duster of the invention can be utilized to apply various dusting agents to garden plants. Thus, the power duster can be used to apply particulate matter such as pesticides, herbicides and fertilizers to such plants.

Having described several embodiments of the garden power duster of the invention, it is believed that other modifications, variations and changes will be suggested to those skilled in the art in view of the disclosure set forth herein. It is therefore to be understood that all such variations, modifications and changes are believed to fall within the scope of the present invention as defined in the claims.

I claim:

1. A garden power duster for applying dusting agent to plants, said power duster consisting of in combination:

blower means whereby a main flow of air is provided;

an air-flow receiving tube removably attached to said blower means and in communication with said main air flow, wherein said air-flow receiving tube contains an air baffle attached to the bottom of the tube, said air baffle having a positive side in communication with the main air-flow and a negative side and said air baffle extending vertically through only a portion of the diameter of the tube thereby leaving a space over the top of the baffle for the passage of air, a positive air duct located at the bottom of the tube on the positive side of the baffle, and a hole located at the bottom of the tube on the negative side of the baffle; and a dusting agent container removably attached to the bottom of said air-flow receiving tube, said dusting agent container containing a lid having an input hole and an output hole and a discharge tube containing a plurality of circumferential holes to assist in mixing the dusting agent, wherein said input hole and output hole of the container lid are in communication with the positive air duct and hole at the bottom of the air-flow receiving tube and wherein said discharge tube extends vertically from the container through said output hole of the container lid into said air-flow receiving tube on the negative side of the air baffle;

whereby a portion of the flow of air passing from the blower means into the air-flow receiving tube is diverted by the air baffle through the positive air duct into the dusting agent container where it entrains a portion of the dusting agent and propels it through the discharge tube into the air-flow receiving tube where the resultant air-dust mixture is picked up by the main air flow passing through the tube and is discharged through the end of said tube.

2. The garden power duster of claims 1 further comprising a control lever to regulate the volume of air flowing through the positive air duct of the air-flow receiving tube into the dusting agent container.

3. The garden power duster of claim 1 further comprising a saddle block having two holes wherein said saddle block is interposed between the air-flow receiving tube and the dusting agent container lid and wherein said holes in the saddle block are in communication with the positive air duct and hole in the bottom of the air-flow receiving tube and the input hole and output hole of the dusting agent container lid.

4. The garden power duster of claim 1 wherein said blower means is an air blower.

5. The garden power duster of claim 1 wherein said blower means is an electrically powered air blower.

6. The garden power duster of claim 1 wherein said blower means is a gasoline powered air blower.

7. The garden power duster of claim 1 wherein said blower is a battery powered air blower.

* * * * *